United States Patent
Schierle-Arndt et al.

(10) Patent No.: US 8,551,319 B2
(45) Date of Patent: Oct. 8, 2013

(54) SOLID POLYCRYSTALLINE POTASSIUM ION CONDUCTOR HAVING A β"-AL$_2$O$_3$ STRUCTURE, ITS PRODUCTION AND THE PREPARATION OF POTASSIUM METAL USING THIS POTASSIUM ION CONDUCTOR

(75) Inventors: Kerstin Schierle-Arndt, Zwingenberg (DE); Günther Huber, Ludwigshafen (DE); Stephen Nicholas Heavens, Ludlow (GB); John Stuart Blackburn, Widnes (GB); Ivor Wynn Jones, Chester (GB)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 13/399,765

(22) Filed: Feb. 17, 2012

(65) Prior Publication Data

US 2012/0145558 A1    Jun. 14, 2012

Related U.S. Application Data

(62) Division of application No. 11/300,473, filed on Dec. 15, 2005, now Pat. No. 8,133,378.

(30) Foreign Application Priority Data

Dec. 16, 2004 (GB) .................................. 0427574.9

(51) Int. Cl.
  *C04B 35/00* (2006.01)
  *C25B 1/42* (2006.01)
(52) U.S. Cl.
  USPC ......................................... 205/407; 501/120

(58) Field of Classification Search
  USPC .......................................... 501/120; 205/407
  See application file for complete search history.

(56) References Cited

U.S. PATENT DOCUMENTS

| 1,446,677 | A | 5/1969 | Tennenhouse |
| 4,021,255 | A | 5/1977 | Chiku et al. |
| 6,077,801 | A | 6/2000 | Zanoli et al. |
| 6,117,807 | A | 9/2000 | Virkar et al. |
| 6,409,908 | B1 | 6/2002 | Huber et al. |
| 6,806,219 | B2 | 10/2004 | Masini et al. |

FOREIGN PATENT DOCUMENTS

| EP | 1 114 883 A1 | 7/2001 |
| GB | 1155927 | 6/1969 |

OTHER PUBLICATIONS

Ullmann's Encyclopedia of Industrial Chemistry, Sixth Edition, 2000, Electronic release, Wiley-VCH Verlag, key word "aluminium oxide", point 1.6: Aluminates and related compounds.

(Continued)

*Primary Examiner* — Harry D Wilkins, III
*Assistant Examiner* — Zulmariam Mendez
(74) *Attorney, Agent, or Firm* — Novak Druce Connolly Bove + Quigg LLP

(57) ABSTRACT

A method is provide for preparing potassium metal which comprises embedding a polycrystalline alkali metal β"-Al$_2$O$_3$ molding in an oxidic powder containing potassium and aluminum of a molar K$_2$O:Al$_2$O$_3$ ratio within the range of 1:(x−1) to 1:(x+1), the weight of oxidic powder amounting to at least two times the weight of the molding; heating the embedded molding at a rate of at least 100° C. per hour to at least 1100° C.; and further heating to at least 1300° C., this temperature being maintained for at least one hour prior to cooling.

10 Claims, 6 Drawing Sheets

(56) References Cited

OTHER PUBLICATIONS

Figure 1:
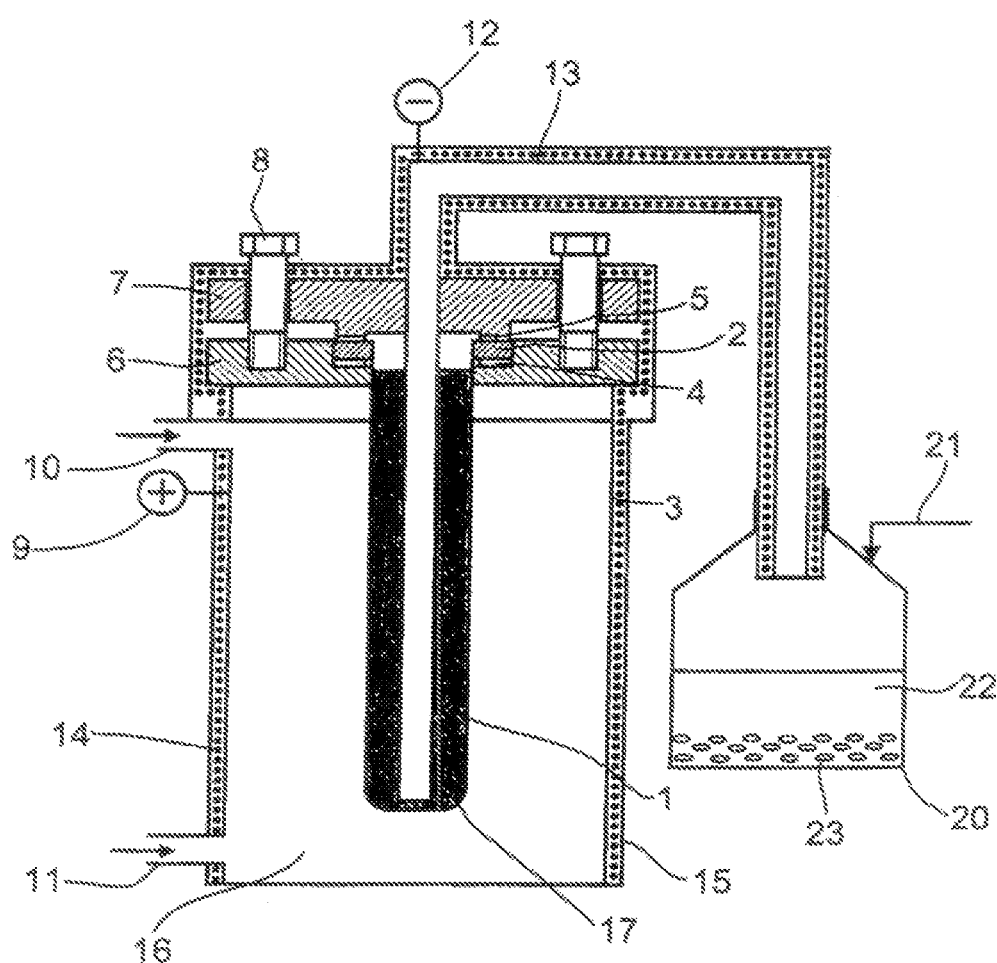

C.R. Peters et al., "Refinement of the Structure of Sodium β-Alumina", *Acta Crystallographica*, Series B 27 (1971), pp. 1826-1834.

M. Bettmann et al., "The Crystal Structure of $Na_2O \cdot MgO\ 5Al_2O_3$ with Reference to $Na_2O \cdot 5Al_2O_3$ and Other Isotypal Compounds." *The Journal of Physical Chemistry* 73 (1969), pp. 1774-1780.

G.A. Vydrik et al., "Synthesis of Potassium β-Alumina". *Inorg. Matr.* vol. 12, No. 10, (1976), pp. 1561-1563.

G.W. Schafer et al., "Direct synthesis of K-β'-alumina: A new route to proton conducting $NH_4H_3O$-β'-alumina polycrystals." *Solid State Ionics* 77 (1995), pp. 234-239.

J.L. Briant et al., "Ionic Conductivity in $Na^+$, $K^+$, and $Ag^+$ β"-Alumina" *Journal of Solid State Chemistry* 33 (1980) pp. 385-390.

A. Tan et al., "The Development of Stress During Na-K-Ion Exchange of Polycrystalline β, β"—$Al_2O_3$ and Its Influence on the Ion Exchange Process," *Solid State Ionics*, 26 (1988), pp. 217-228.

G. M. Crosbie et al., "Potassium Beta"—Alumina Membranes", *Journal of the American Ceramic Society*, vol. 65, No. 4, (1982), pp. 187-191.

R.M. Williams et al., "Potassium β↑—Alumina/Potassium/Molybdenum Electrochemical Cells," Proc. 29th Intersociety Energy Conversion Conference 1994 (AIAA-94-3833-CP), pp. 888-893.

R.M. Williams et al., "Time Dependence of the High Temperature Conductivity of Sodium and Potassium Beta"—Alumina Ceramics in Alkali Metal Vapor," *Journal Electrochemical Society* vol. 142 (1995), pp. 4246-4251.

S.M. Park et al., "Na to K vapor-phase exchange in polycrystalline β" alumina," *Solid State Ionics* 46 (1991), pp. 221-231.

SOLID POLYCRYSTALLINE POTASSIUM ION CONDUCTOR HAVING A β"-AL$_2$O$_3$ STRUCTURE, ITS PRODUCTION AND THE PREPARATION OF POTASSIUM METAL USING THIS POTASSIUM ION CONDUCTOR

CROSS-REFERENCE TO RELATED APPLICATIONS

This application is a Division of co-pending U.S. patent application Ser. No. 11/300,473 filed on Dec. 15, 2005, which claims priority of Application No. 0427574.9 filed on Dec. 16, 2004, in the United Kingdom. The disclosures of the prior applications are incorporated herein in their entirety by reference.

The present invention relates to a solid potassium ion conductor having a β"-Al$_2$O$_3$ structure, a process for its production, and a process for the preparation of potassium using this potassium ion conductor.

Alkali metal ion conductors are known. Among the various known types those having a β-Al$_2$O$_3$ structure and those having a β"-Al$_2$O$_3$ structure have become very important owing to their comparatively high conductivity and corresponding low resistivity. They are used, inter alia, in sensors, batteries or electrolysis cells for producing alkali metals.

β-Al$_2$O$_3$ (β-aluminium oxide) was traditionally a generic name for sodium aluminates having an overall composition which corresponds to a molar ratio of Na$_2$O to Al$_2$O$_3$ from 1:1 to 1:11 (cf. Ullmann's Encyclopedia of Industrial Chemistry, Sixth Edition, 2000 Electronic Release, WILEY-VCH Verlag GmbH & Co., KGaA, Weinheim, key word "Aluminium Oxide", point 1.6: Aluminates and Related Compounds). In particular, the term β-Al$_2$O$_3$ is now often used for sodium aluminates having a hexagonal crystal structure, ideally with the space group P6$_3$/mmc (cf. C. R. Peters, M. Bettmann, J. W. Moore and M. D. Glick, Acta Crystallographica, Series B, 27 (1971), 1826 et seq.). The modification defined as β"-Al$_2$O$_3$ likewise has a hexagonal crystal structure but ideally with space group R/3 m, a slightly different arrangement and symmetry of the atoms in the unit cell (M. Bettmann and C. R. Peters, J. Phys. Chem. 73 (1969), 1774 et seq.). A distinguishing feature is the longer c axis (this is the usual term for the axis which makes right angles with the other two axes (a and b axes, which are equal for the hexagonal unit cell) and may have a length differing from these) of the hexagonal unit cell in β"-Al$_2$O$_3$ compared with β-Al$_2$O$_3$. The crystal structures of β- and β"-Al$_2$O$_3$ permit some variation in stoichiometry, for example an increase in the sodium content to Na:Al ratios of 1:4.5 or the incorporation of other ions. They are defect structures in which the sodium ions are relatively mobile.

Such compounds are also known for other alkali metals. In particular, sodium can be replaced by potassium. These compounds are referred to as potassium β-Al$_2$O$_3$ or potassium β"-Al$_2$O$_3$, so that the terms β-Al$_2$O$_3$ and β"-Al$_2$O$_3$ which have become established for the sodium compound often have to be expressed more precisely as sodium β-Al$_2$O$_3$ and sodium β"-Al$_2$O$_3$ for the sake of clarity. The names β"-Al$_2$O$_3$, β"-aluminium oxide and β"-alumina are generally used synonymously for the same composition of matter, as are the names β-Al$_2$O$_3$, β-aluminium oxide, and β-alumina.

Sodium β"-Al$_2$O$_3$ which can be used for technical applications can be synthesized directly, for example by mixing and calcining Al$_2$O$_3$ with NaAlO$_2$, NaHCO$_3$ or Na$_2$CO$_3$. Often, a small amount of lithium, zirconium and/or magnesium compounds, for example MgO, ZrO$_2$ or LiOH, is added since small amounts of lithium and/or magnesium stabilize β"-Al$_2$O$_3$ structures and zirconium oxide, which forms a discrete secondary phase, makes the ceramic tougher and stronger and also traps impurities which otherwise may negatively impact ionic conductivity, such as calcium. However, analogous experiments for the preparation of potassium β"-Al$_2$O$_3$ generally lead to potassium β-Al$_2$O$_3$ (cf. G. A. Vydrik, I. V. Fedina and G. A. Naidenova, Inorg. Mater. 12 (1976), 1897 et seq.). G. W. Schafer, H. J. Kim and F. Aldinger, Solid State Ionics 77 (1995), 234 et seq. describe the direct synthesis of potassium β"-Al$_2$O$_3$ stabilized with magnesium ions by milling, calcining and hot-pressing a mixture of hydrated aluminium oxides, potassium hydroxide and magnesium nitrate, which, under certain conditions, leads to single-phase potassium β"-Al$_2$O$_3$. However, the product thus prepared has only 93% of the theoretical density and a resistivity of more than 1000 Ωcm at 300° C., which makes it unusable for technical applications for which helium tightness is usually required, i.e. the mouldings have leakage rates of less than $1 \cdot 10^{-9}$ mbar·liter·sec$^{-1}$ in the helium leak test.

Usually, potassium β"-Al$_2$O$_3$ is prepared by exchange of sodium ions in sodium β"-Al$_2$O$_3$ for potassium ions. As complete exchange as possible of sodium for potassium is desirable since otherwise—very particularly in the case of the higher ion current desired for technical applications since it is considerably more economical—potential disturbances occur, which in extreme cases may lead to the mechanical destruction of the ceramic. However, on complete exchange of sodium ions for the considerably larger potassium ions, a marked increase in volume of the unit cell of the crystal lattice takes place since potassium ions are larger than sodium ions. For monocrystals, this is often still very readily controllable (J. L. Briant and G. C. Farrington, J. Solid State Chem. 33 (1980), 385 et seq.), but in the case of ion exchange in β"-Al$_2$O$_3$ ceramics, i.e. polycrystalline mouldings as required for technical applications this easily leads to formation of cracks in the brittle ceramic. This is particularly pronounced in the case of ion exchange by bringing the ceramic into contact with liquid potassium ion sources. A. Tan and P. S. Nicholson, Solid State Ionics, 26 (1988), 217 et seq., investigated the ion exchange of sodium in mixed sodium β"- and sodium β-Al$_2$O$_3$ for potassium with KCl/NaCl melts but were unable to produce crack-free, completely exchanged ceramics.

U.S. Pat. No. 3,446,677 describes a process for exchanging sodium ions for potassium ions in cylindrical β"-Al$_2$O$_3$ ceramic mouldings by an exchange step in the gas phase by placing the sodium β"-Al$_2$O$_3$ ceramic in a platinum crucible on a bed of potassium aluminate within a larger platinum crucible and heating it. A ceramic in which sodium was partly replaced by potassium and whose resistivity at 300° C. is 22 Ωcm was obtained. In order to achieve a higher degree (max 50%) of ion exchange, however, other ion exchange steps with potassium chloride vapour and molten potassium nitrate have to be carried out. In these, the resistivity at 300° C. decreases to 8 Ωcm, but the presence of chloride during the ion exchange leads to chloride-containing potassium β"-Al$_2$O$_3$ which is unusable for some applications, and ion exchange with molten potassium nitrate leads to cracking, as does a residual amount of sodium due to incomplete ion exchange during use of the ceramic as potassium ion conductor, which cannot be tolerated particularly in the case of relatively large mouldings for technical applications. It should be noted that the resistivity of a sodium-containing (i.e. only partly exchanged) potassium β"-Al$_2$O$_3$ ceramic will in general be smaller than that of the pure potassium ceramic.

G. M. Crosbie and G. J. Tennenhouse, J. Am. Ceram. Soc. 65 (1982), 187 et seq., disclose a similar process which uses molten potassium nitrate only to lower the residual sodium content to zero, but with which only a substantially higher resistivity at 300° C. of 29 Ωcm is achieved. Further, this process lowers the strength of the ceramic to an unacceptable extent.

R. M. Williams, A. Kisor, M. A. Ryan, B. Jeffries-Nakamura, S. Kikkert and D. E. O'Connor describe, in Proc. 29$^{th}$ Intersociety Energy Conversion Conference, 1994 (AIAA-94-3833-CP), page 888 et seq., a slightly modified process in which the ceramic is embedded in a potassium aluminate but potassium chloride vapour is still used as a potassium source. R. M. Williams, A. Kisor and M. A. Ryan point out, in J. Electrochem. Soc. 142 (1995), 4246 et seq., the possibility of carrying out the ion exchange by means of potassium chloride vapour also under reduced pressure instead of in a potassium aluminate bed. By means of kinetic investigations during the ion exchange in sodium $\beta"$-$Al_2O_3$ ceramic mouldings by means of potassium chloride vapour, S. M. Park and E. E. Hellstrom, Solid State Ionics 46 (1991), 221 et seq., found that the rate-determining step of the ion exchange is the transport of the byproduct sodium chloride from the ceramic via the gas phase into the sodium chloride source, and often observed cracking, including disintegration of the mouldings into powder.

Processes for the preparation of alkali metals by electrolysis of an alkali metal amalgam forming the anode of an electrolytic cell, with the alkali metal to be obtained made the cathode, anode space and cathode spaces being separated by a membrane conducting alkali metal ions, are also known (the solid ion conductor in an electrolysis cell is often referred to as membrane). GB 1,155,927 discloses such a process, but the teaching of this publication is directed in particular toward obtaining sodium by the use of a sodium $\beta$-$Al_2O_3$ membrane, and neither potassium $\beta"$-alumina nor the preparation of potassium metal are explicitly mentioned. EP 1 114 883 A1 (and its equivalents DE 198 59 563 A1 and U.S. Pat. No. 6,409,908 B1) discloses an improved process of this type which is also suitable for the preparation of potassium using potassium $\beta"$-$Al_2O_3$ membranes. The required cell voltages at relatively high currents are from 2 to 2.12 V. However, these processes are always dependent on the availability of good potassium ion-conducting ceramics and can be decisively improved by using better ceramics. In particular, it is desirable to reduce the cell voltage required for the electrolysis and hence the energy requirement of the process as far as possible.

It is therefore an objective of the present invention to provide a chloride-free potassium $\beta"$-$Al_2O_3$ which can be widely used technically as a potassium ion conductor, in particular in the form of a polycrystalline ceramic of any desired shape, and a process for its preparation which makes it possible, in particular, to convert alkali metal, in particular sodium $\beta"$-$Al_2O_3$ ceramic mouldings or sodium/potassium $\beta"$-$Al_2O_3$ ceramic mouldings (i.e. sodium $\beta"$-$Al_2O_3$ ceramic mouldings in which the sodium ions are already partly exchanged for potassium ions) into potassium $\beta"$-$Al_2O_3$ ceramic mouldings, as required for technical applications. without troublesome sodium residues remaining and without cracking occurring to a troublesome extent. The ceramic should moreover have long service life. It is a further objective of the present invention to provide a novel process for the preparation of potassium metal using the novel potassium $\beta"$-$Al_2O_3$ ceramic.

We have found that this objective is achieved by a solid polycrystalline potassium ion conductor having a $\beta"$-$Al_2O_3$ structure, obtainable by means of ion exchange of the alkali metal ions of a polycrystalline alkali metal $\beta"$-$Al_2O_3$ moulding, in which the alkali metal ions are sodium ions or a mixture of sodium and potassium ions and in which the molar ratio $M_2O$ (M=alkali metal) to $Al_2O_3$ is 1:x, x being an integer or non-integer number within the range 5 to 11, for potassium ions, the ion exchange being effected by a process wherein neither chloride-containing nor liquid potassium ion sources are used, the process comprising the steps of:
embedding the polycrystalline alkali metal $\beta"$-$Al_2O_3$ moulding in an oxidic powder containing potassium and aluminium of a molar $K_2O$ to $Al_2O_3$ ratio within the range 1:(x−1) to 1:(x+1), the weight of oxidic powder amounting to at least two times the weight of the moulding;
heating the embedded moulding at a rate of at least 100° C. per hour to at least 1100° C.; and
further heating to at least 1300° C., this temperature being maintained for at least one hour prior to cooling.

We have furthermore found a process for the production of a solid polycrystalline potassium ion conductor having a $\beta"$-$Al_2O_3$ structure by ion exchange of the alkali metal ions of a polycrystalline alkali metal $\beta"$-$Al_2O_3$ moulding, in which the alkali metal ions are sodium ions or a mixture of sodium and potassium ions and the molar ratio $M_2O$ (M=alkali metal) to $Al_2O_3$ is 1:x, x being an integer or non-integer number within the range 5 to 11, for potassium ions, neither chloride-containing nor liquid potassium ion sources being used, comprising the steps of:
embedding a polycrystalline moulding of alkali metal $\beta"$-$Al_2O_3$ in an oxidic powder containing potassium and aluminium of a molar $K_2O$ to $Al_2O_3$ ratio within the range 1:(x−1) to 1:(x+1), the weight of oxidic powder amounting to at least two times the weight of the moulding;
heating the embedded moulding at a rate of at least 100° C. per hour to at least 1100° C.; and
further heating to at least 1300° C., this temperature being maintained for at least one hour prior to cooling.

We have furthermore found a process for the preparation of potassium metal starting from potassium amalgam by electrolysis using a potassium amalgam-containing anode, a potassium ion conducting solid electrolyte and liquid potassium metal as the cathode, wherein the novel potassium ion conductor is used as the solid electrolyte.

The novel potassium ion conductor has a $\beta"$-$Al_2O_3$ structure and generally contains predominantly potassium $\beta"$-$Al_2O_3$, i.e. at least 50% by weight of potassium $\beta"$-$Al_2O_3$. Usually, it contains at least 80, preferably at least 85, particularly preferably at least 90, % by weight of potassium $\beta"$-$Al_2O_3$. A novel ion conductor which comprises at least 95% by weight of potassium $\beta"$-$Al_2O_3$, i.e. substantially or completely consists of potassium $\beta"$-$Al_2O_3$, may likewise be advantageous particularly if very good ion conductivity is required. If the mechanical and/or thermal stability of the ion conductor plays an important role in the relevant application, the ion conductor can be stabilized. Measures for stabilizing an alkali metal $\beta"$-$Al_2O_3$ structure are known. In particular, it may be advantageous to add stabilizing additives to the ion conductor. Known and suitable stabilizing additives are, for example, lithium and/or magnesium salts or ions. Additionally, zirconium salts (in particular zirconium oxide or any precursor thereof) may also be added as a stabilizing additive, although their effect is believed to be stabilizing the ceramic by toughening and strengthening as well as trapping impurities which otherwise may negatively impact ionic conductivity, such as calcium, rather than stabilizing the alkali metal $\beta"$-$Al_2O_3$ structure itself such as magnesium and lithium do. Typical amounts of these additives, if they are used, are generally at least 0.1, preferably at least 0.3, particularly preferably at least 0.5, % by weight of $Li_2O$ and generally not more than 1.5, preferably not more than 1.3, particularly preferably not more than 1.0, % by weight of $Li_2O$; generally at least 0.5, preferably at least 1.0, particularly preferably at least 2.0, % by weight of MgO and generally not more than 8.0, preferably not more than 7.0, particularly preferably not more than 6.0, % by weight of MgO; and/or generally at least 1.0, preferably at least 2.0, particularly preferably at least 4.0, % by weight of $ZrO_2$ and generally not more than 12.0, preferably not more than 11.0, particularly preferably not more than 10.0, % by weight of $ZrO_2$, based in each case on the amount of the stabilized potassium $\beta''$-$Al_2O_3$, i.e. of the potassium $\beta''$-$Al_2O_3$ including the stabilizing additives.

For example, the potassium $\beta''$-$Al_2O_3$ can be stabilized with 0.7% by weight of $Li_2O$, 4% by weight of MgO and/or 8% by weight of $ZrO_2$, based in each case on the amount of the stabilized potassium $\beta''$-$Al_2O_3$.

The ratio of potassium to aluminium, usually expressed as molar $K_2O$ to $Al_2O_3$ ratio of 1:x in the novel ion conductor is within the known range customary for potassium $\beta''$-$Al_2O_3$. A higher potassium content does increase the ion conductivity of the ion conductor, but it is known that the potassium content in the potassium $\beta''$-$Al_2O_3$ cannot be increased arbitrarily, since otherwise the $\beta''$-$Al_2O_3$ structure is no longer stable. The value of x in the molar ratio of $K_2O$ to $Al_2O_3$ of 1:x is therefore generally at least 5, preferably at least 5,5 and particularly preferably at least 6 and generally not more than 11, preferably not more than 9 and particularly preferably not more than 7. Further examples of x are 6,1, 6,2, 6.3, 6.4, 6,5, 6,7, 6, 8 or 6,9.

The overall composition, the shape and the structure of the novel ion conductor are determined decisively by the alkali metal $\beta''$-$Al_2O_3$ used as starting material of the novel production process for the ion conductor. A particular advantage of the novel production process for the novel potassium $\beta''$-$Al_2O_3$ ion conductor is that the material and mechanical properties of the alkali metal $\beta''$-$Al_2O_3$ ion conductor used as starting material are thereby transferred directly to the prepared potassium $\beta''$-$Al_2O_3$ ion conductor, of course with the exception of the alkali metal ions replaced by potassium ions by the novel process. The potassium ion conductor thus produced is also tight and mechanically and thermally stable, in particular free of cracks, as in the case of the alkali metal ion conductor used as starting material. The novel potassium ion conductor is chloride-free, has substantially better ion conductivity than chloride-free potassium $\beta''$-$Al_2O_3$ ion conductors obtainable by previously known processes, and has higher strength than known potassium ion conductor ceramics. As a pure (sodium fully exchanged for potassium) potassium $\beta''$-$Al_2O_3$ ceramic, it typically achieves resistivities at 300° C. of 20±3 Ωcm instead of the at least 22 Ωcm for known sodium-containing (partly exchanged) ceramics and up to more than 1000 Ωcm of known pure potassium $\beta''$-$Al_2O_3$ ion conductors according to the previously known prior art. This leads, inter alia, to considerably lower cell voltages when the novel ion conductor is used for electrolytic potassium recovery from amalgam, and also improves the applicability of the novel potassium ion conductor in other applications, for example as a sensor.

The novel process for the production of the novel potassium ion conductor is an ion exchange process in which the alkali metal ions in a polycrystalline moulding comprising alkali metal $\beta''$-$Al_2O_3$ are exchanged for potassium ions. Although it is possible to convert a alkali metal $\beta''$-$Al_2O_3$ single crystal into a potassium $\beta''$-$Al_2O_3$ single crystal by the novel process, other, simpler processes are also available. Since monocrystals cannot be machined by conventional means and have far too low strength for practical purposes, only polycrystalline mouldings are suitable for technical applications, i.e. ceramics whose shape is adapted to their technical application. (The terms "polycrystalline moulding" and "ceramic" are generally used synonymously do describe an article of three-dimensional shape.)

Generally, a sodium $\beta''$-$Al_2O_3$ moulding is selected as the polycrystalline moulding comprising alkali metal $\beta''$-$Al_2O_3$ to be ultimately converted into a potassium $\beta''$-$Al_2O_3$ moulding since sodium $\beta''$-$Al_2O_3$ mouldings are readily available, can be produced in any desired shape with good mechanic properties. However, it is also possible to use a $\beta''$-$Al_2O_3$ moulding in which sodium ions have already been partly exchanged for potassium ions. Whenever the process of this invention does not lead to complete ion exchange and therefore has to be repeated (see below), inevitably a sodium/potassium $\beta''$-$Al_2O_3$ moulding in which the sodium ions have been partly exchanged for potassium will be used.

For carrying out the novel process, an alkali metal $\beta''$-$Al_2O_3$ ceramic having the shape of the potassium $\beta''$-$Al_2O_3$ ceramic to be produced is chosen. The molar ratio of alkali metal oxide $M_2O$ to $Al_2O_3$ (M=alkali metal) in the alkali metal $\beta''$-$Al_2O_3$ ceramic is preferably chosen to be the same as the molar ratio of $K_2O$ to $Al_2O_3$ which is desired in the potassium $\beta''$-$Al_2O_3$ ceramic to be produced. This alkali metal $\beta''$-$Al_2O_3$ ceramic is produced in a conventional manner. In the usual case, where a sodium $\beta''$-$Al_2O_3$ ceramic is used as the starting material, $\alpha$-$Al_2O_3$ is generally mixed with $NaAlO_2$, $NaHCO_3$ and/or $Na_2CO_3$ in the desired ratio, pressed into the desired mould and calcined. If desired, a small amount of lithium, zirconium and/or magnesium compounds, for example MgO, $ZrO_2$ or LiOH, can be added in order to stabilize the structure or ceramic. These processes are known, and sodium $\beta''$-$Al_2O_3$ ceramics are also commercially available. Some potassium may be introduced into these ceramics by substituting sodium compounds for potassium compounds in the production process or by an ion exchange process, for example the process of this invention.

For carrying out the novel process, the alkali metal $\beta''$-$Al_2O_3$ ceramic is embedded in an oxidic powder containing potassium and aluminium. Any cavities in the ceramics are filled with the powder. The ceramic is usually embedded in the powder in a suitable container. Suitable containers are in particular conventional saggars in which the arrangement of powder and ceramic can also be directly calcined, for example the known saggars comprising magnesium oxide, magnesium aluminate spinel or aluminium oxide.

The oxidic powder contains potassium and aluminium. In the preferred case, it is a potassium $\beta''$-$Al_2O_3$ powder, but the crystal structure is not decisive and merely depends on the overall composition. Mixtures of different potassium aluminates or of potassium oxide with aluminium oxide can also be used. The powder can optionally contain the same stabilizers in the same amounts as the alkali metal $\beta''$-$Al_2O_3$ ceramic used or the potassium $\beta''$-$Al_2O_3$ ceramic to be produced. A decisive aspect in the novel process is that the molar amount of potassium in the oxidic powder does not deviate substantially from the molar amount of alkali metal in the alkali metal $\beta''$-$Al_2O_3$ ceramic used. In the case of a molar $Na_2O$:$Al_2O_3$ ratio in a sodium $\beta''$-$Al_2O_3$ ceramic of 1:x, a molar $K_2O$:$Al_2O_3$ ratio in the powder within the range of 1:(x−1) to 1:(x+1), preferably within the range 1:(x−0.5) to 1:(x+0.5), particularly preferably within the range 1:(x−0.1) to 1:(x+0.1) is generally established for this purpose. If, for example, the molar $Na_2O$:$Al_2O_3$ ratio in the sodium $\beta''$-$Al_2O_3$ ceramic is 1:6.5, a molar $K_2O$:$Al_2O_3$ ratio of in general from 1:5.5 to 1:7.5, preferably from 1:6 to 1:7, particularly preferably from 1:6.4 to 1:6.6, is established in the oxidic powder. For example, an identical ratio is established in the ceramic and in the powder. For a ceramic in which the sodium ions are partly exchanged for potassium ions, the molar $K_2O:Al_2O_3$ ratio in the powder, is adjusted according to the molar $(Na_2O+K_2O):Al_2O_3$ ratio in the ceramic. If the potassium content is chosen to be too high, undesired water-soluble phases, such as $KAlO_2$ form in the ceramic, which lead to moisture absorption of the ceramic in air and gradually to weakening and fracture of the ceramic. With the correct composition of the powder, the potassium $\beta''-Al_2O_3$ ceramic produced is generally sufficiently stable to moisture.

The powder is conveniently prepared as potassium $\beta$-$Al_2O_3$. For this purpose, an aluminium compound, for example $\alpha$-$Al_2O_3$, an aluminium hydroxide and/or a hydrated aluminium oxide, is usually mixed with a potassium source, for example $KAlO_2$, $KHCO_3$ and/or $K_2CO_3$, in the desired ratio and is calcined. If stabilization of the ceramic is desired, the desired amount of stabilizer, for example of lithium, of zirconium and/or magnesium compounds, such as MgO, $ZrO_2$ or LiOH, can be added. For the preparation of the powder, the mixture of the starting materials of the powder is usually calcined in general for at least 15, preferably at least 30, particularly preferably at least 45, minutes and in general for not more than 6, preferably not more than 4, particularly preferably not more than 2, hours at in general at least 600° C., preferably at least 800° C., particularly preferably at least 1000° C. and in general not more than 1800° C., preferably not more than 1600° C., particularly preferably not more than 1400° C. As stated above, it is not necessary to produce single-phase potassium $\beta$-$Al_2O_3$ or single-phase powder at all, provided that the aluminium content and especially the potassium content of the powder are established as chosen.

The powder can in principle be used in any particle size customary for powder. However, very fine powders e.g. those of mean particle size less than 10 μm are often difficult to handle because they tend to sinter and to adhere to the ceramic body during the ion exchange, and in the case of very coarse powders, the rate of ion exchange decreases in an economically unsatisfactory manner. The mean particle size of the powder is therefore generally at least 20 μm, preferably at least 30 μm, particularly preferably at least 50 μm, and in general not more than 500 μm, preferably not more than 300 μm, particularly preferably not more than 100 μm. The mean particle size is established, if necessary, by conventional comminution methods, such as milling or crushing of coarser powders, conventional agglomeration methods, such as pelleting, tabletting, extrusion and crushing of finer powders, and conventional classification methods, such as sieving. If an $Al_2O_3$ powder of a suitable mean particle size is used, further adjustment of the mean particle size is generally unnecessary.

The ceramic is embedded in a sufficient amount of the powder so that sufficient potassium is available for the ion exchange. In general, at least two times the amount by weight (i.e. the weight of the powder is at least two times as great as the weight of the ceramic) of the powder is sufficient. Preferably, at least three times the amount by weight is used and more preferably, at least four times the amount by weight. In principle, the powder can be used in an excess which has no upper limit, but, exclusively for economic reasons, it is not expedient to use more than necessary. Usually, the saggar is filled with the ceramic and powder so that the ceramic is in contact with the powder on all sides and is thoroughly covered therewith, provided that at least two times the amount of powder is used.

The sodium $\beta''-Al_2O_3$ ceramic embedded in the powder is heated in a suitable vessel, for example a saggar, in a conventional oven to a temperature at which the ion exchange takes place. It is advantageous to heat ceramic and powder as rapidly as possible to a temperature at which the flexibility of the crystal lattice is sufficiently high to permit ion exchange without cracking. For this purpose, ceramic and powder are generally brought very rapidly to a first temperature of in general at least 1100° C., preferably at least 1150° C., particularly preferably at least 1200° C. The heating rate is generally at least 100, preferably at least 200, particularly preferably at least 250° C. per hour. A suitable heating rate is, for example, 300° C. per hour. Ceramic and powder are then brought to a second temperature at which the ion exchange takes place at a satisfactory rate. This second temperature is in general at least 1300° C., preferably at least 1350° C. A suitable second temperature is, for example, 1350° C. or 1400° C. Higher temperatures are generally not expedient. The heating rate established for reaching the second temperature is not critical and may be lower than that established for reaching the first temperature, but need not be so. In general, a heating rate of 100° C. per hour is sufficient here. However, ceramic and powder can just as well be brought to the second, higher temperature used for the ion exchange in one operation with the same heating rate.

Ceramic and powder are kept at the second, higher temperature for a duration of, in general, at least one hour, preferably at least 90 minutes, particularly preferably at least 2 hours and, in general, not more than 10, preferably not more than 8, particularly preferably not more than 6, hours. A typical duration is for example 3 to 4 hours. Ceramic and powder are then allowed to cool.

Usually, in such an ion exchange step, not all of the sodium in the ceramic is replaced by potassium but only from 90 to 95% of the sodium. A residual content of 5 to 10% by mole of sodium, relative to the total alkali content is usually too high for technical applications of potassium $\beta''-Al_2O_3$ ceramics. In the case in which a pure sodium $p''-Al_2O_3$ ceramic is used as starting material, the cycle is therefore usually repeated at least once, preferably at least twice, particularly preferably at least three times. Particularly in the case of mouldings of relatively large wall thickness, for example 2 mm or more, the cycle is preferably repeated at least four times or even more often, in any case so often that the desired degree of exchange of sodium for potassium is reached. Especially in the case in which a mixed sodium/potassium ceramic is used as starting material, fewer repetitions or none at all may be sufficient. For each repetition, the ceramic is embedded in each case in fresh powder which has a composition according to the above criteria, but its potassium oxide content is established not only according to the molar $Na_2O:Al_2O_3$ ratio in the partly exchanged potassium/sodium $p''-Al_2O_3$ ceramic produced in the preceding ion exchange step, but according to the molar $(Na_2O+K_2O):Al_2O_3$ ratio in this ceramic. In other words, the total alkali contents (on a molar ratio basis) of ceramic and powder should be in the same range, similar or identical. In most cases, powders having identical potassium content may be used in all exchange steps.

Preferably, the first ion exchange step is carried out with powder which consists exclusively of potassium aluminate and contains no stabilizing additives, such as lithium, magnesium and/or zirconium. The second and the subsequent ion exchange steps are then preferably carried out with powders which contain stabilizing additives.

The powder is the potassium ion source in the novel ion exchange process, preferably the only source. In the novel process, the ion exchange takes place via the gas phase, the ceramic therefore does not come into contact with liquid potassium sources, and the customary problems of cracking are avoided. At the same time, the potassium source is chloride-free, so that the ceramic produced is likewise chloride-free and the customary problems with chloride-containing ceramics are avoided. Subsequent ion exchange steps, for example treatment with a potassium nitrate melt or with potassium chloride vapour, are not required.

In the novel process for the preparation of potassium metal starting from potassium amalgam by electrolysis using a potassium amalgam-containing anode, a potassium ion-conducting solid electrolyte and liquid potassium metal as the cathode, the novel solid potassium ion conductor having a $\beta''$-$Al_2O_3$ structure is used. In particular, the novel potassium ion conductor is used in the form of a ceramic comprising potassium $\beta''$-$Al_2O_3$ as the potassium ion-conducting solid electrolyte. The novel process is otherwise carried out in the same way as known processes. A preferred embodiment of the novel process is the use of the novel solid potassium ion conductor in the process of EP 1 114 883 or its equivalents DE 198 59 563 A1 and U.S. Pat. No. 6,409,908 B1, which are hereby incorporated by reference. With the use of the novel solid potassium ion conductor in the process of EP 1 114 883, however, lower cell voltages are established at comparable currents and current densities; the process is therefore considerably more economical as a result of a declining energy consumption.

The term potassium amalgam designates a solution of potassium in mercury, which is liquid at the temperature of the electrolysis process. In order to keep a potassium amalgam in liquid form, the potassium concentration of the solution is less than 1.5, preferably from 0.3 to 0.6% by weight. The potassium amalgam obtained on an industrial scale substantially contains metallic impurities in the concentration range from 1 to 30 ppm, for example copper, iron, sodium, lead and zinc.

In the novel process, the anode potential is maintained so that exclusively potassium is anodically oxidized to the potassium ion, which is transported as an ion through the solid electrolyte in the electric field and is finally cathodically reduced to potassium metal.

The terms potassium $\beta''$-$Al_2O_3$, membrane, solid electrolyte, ceramic and ion conductor are used synonymously in the case of the use of potassium $\beta''$-$Al_2O_3$ for potassium synthesis (and generally in any process for alkali metal preparation using alkali metal $\beta''$-$Al_2O_3$ as a solid ion conductor).

Figure 2:
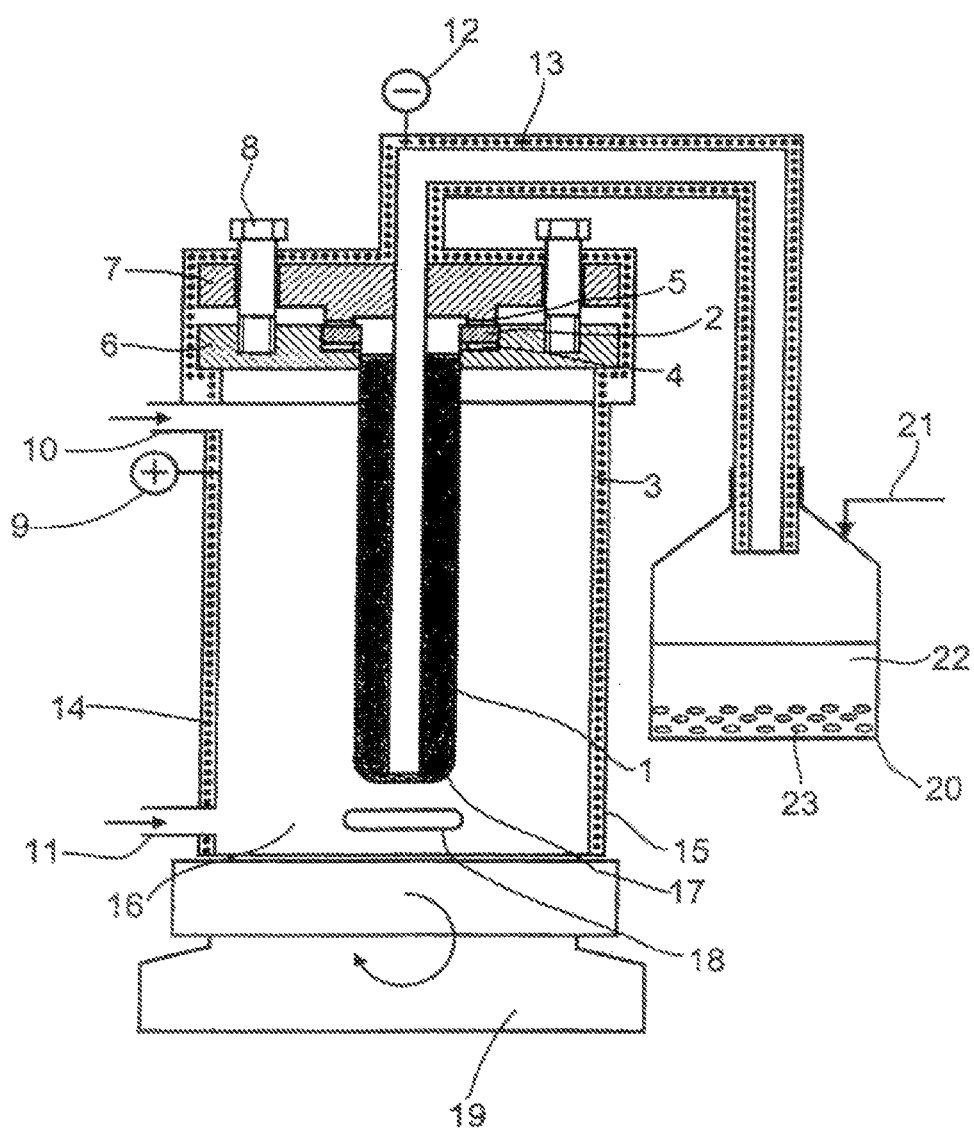
Figure 3:
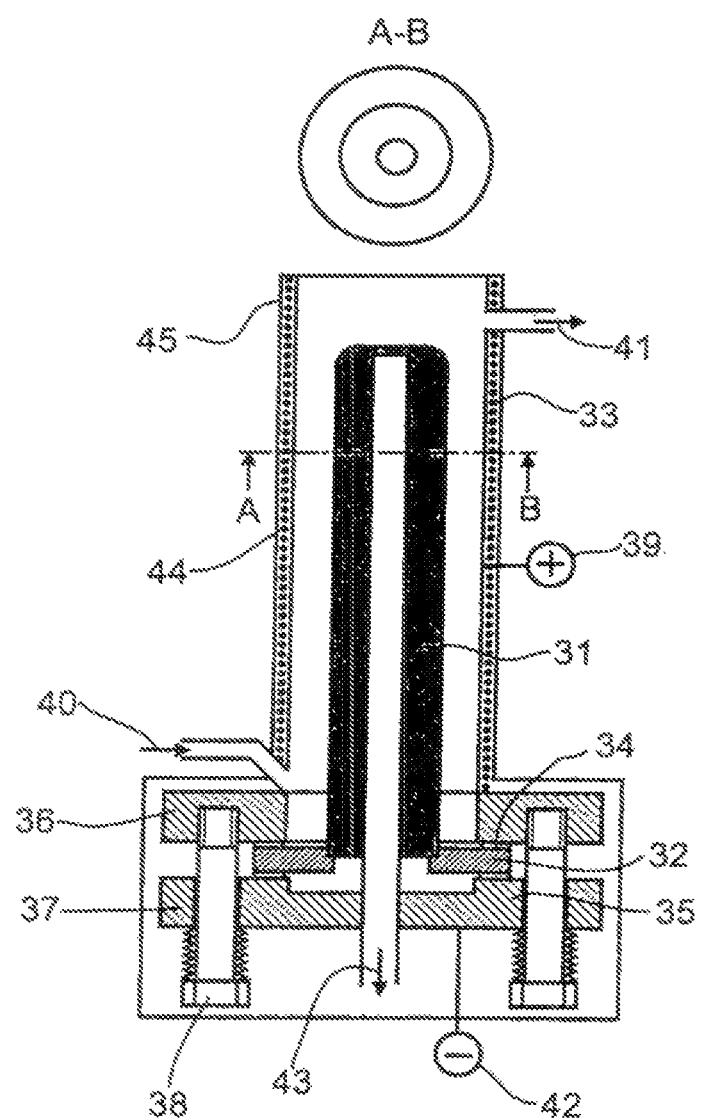
Figure 4:
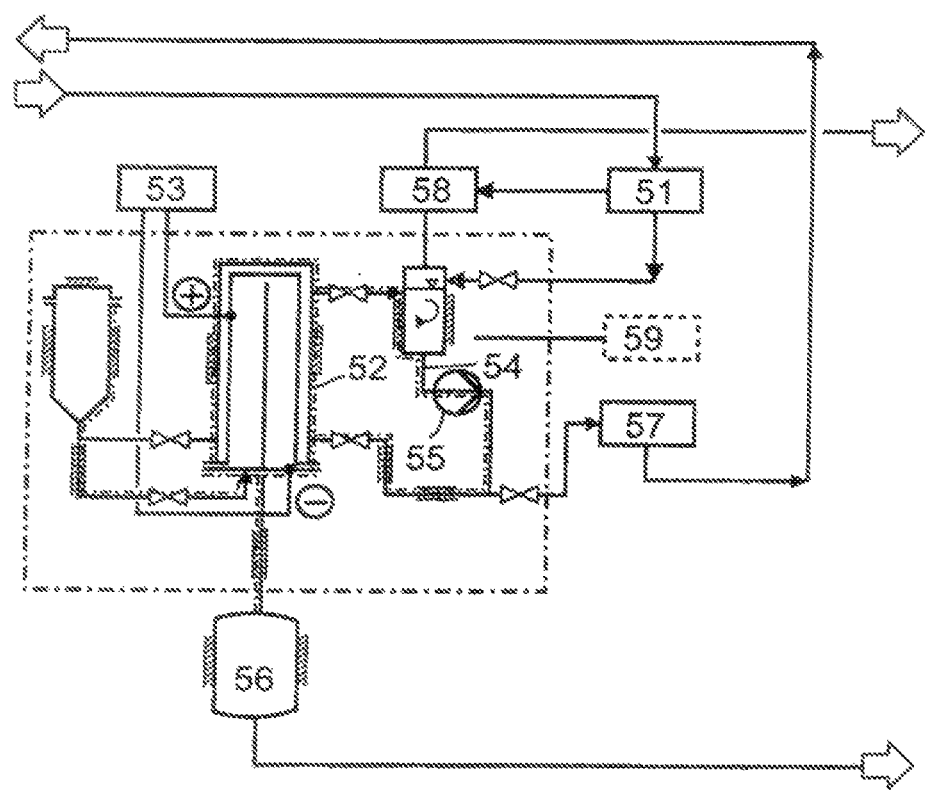
Figure 5:
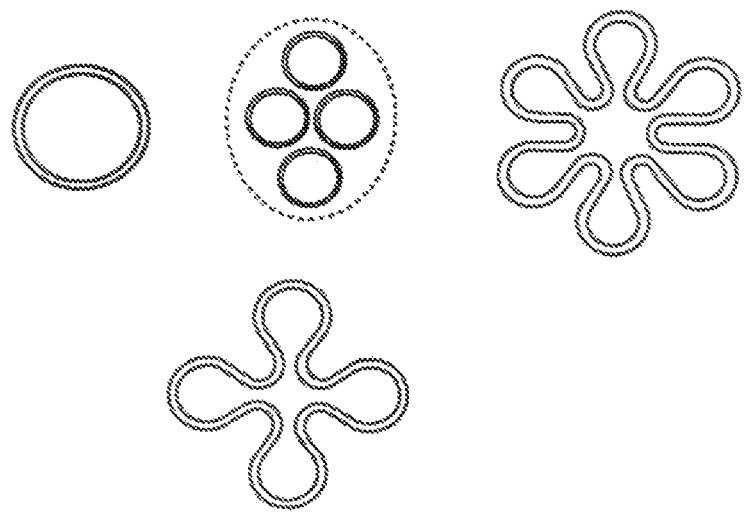
Figure 6:
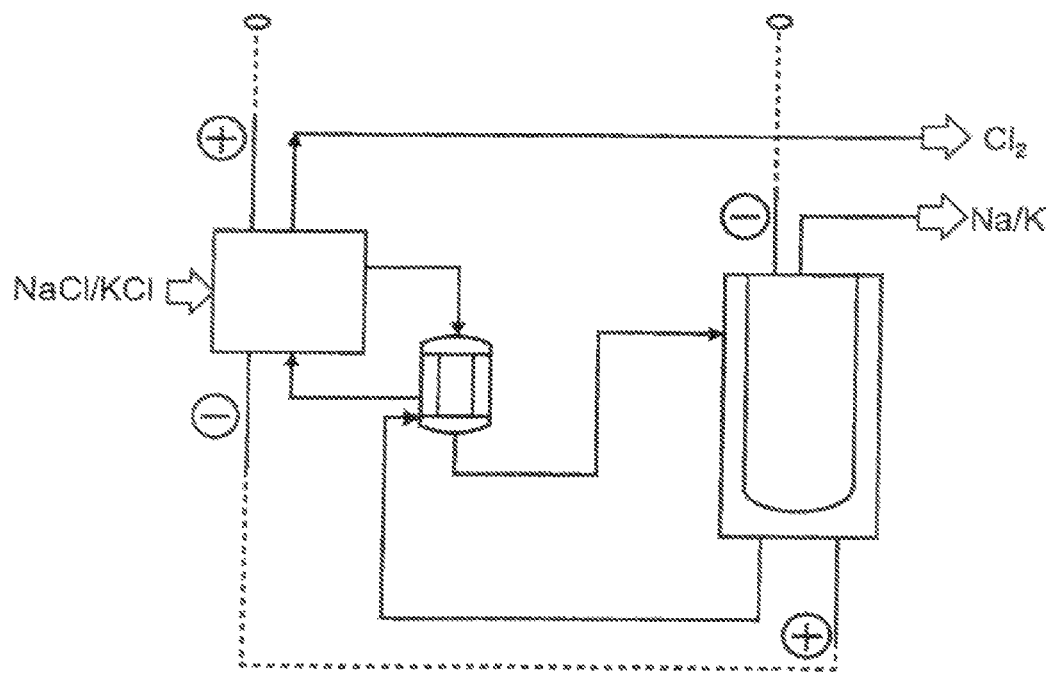

The following figures are attached to the present Application:

FIG. 1: Schematic diagram of an electrolysis cell according to GB 1,155,927 (comparative cell); the reference numerals correspond to those in FIG. 2 (cf. example 11);

FIG. 2: Schematic diagram of an electrolysis cell which can be used in the novel process and has a stirrer (for reference numerals, cf. example 11);

FIG. 3: Schematic diagram of an alternative embodiment of an electrolysis cell which can be used in the novel process (for reference numerals, cf. example 13);

FIG. 4: Schematic diagram of an apparatus which is designed for continuous operation and into which an electrolysis cell according to FIG. 3 is incorporated (for reference numerals, cf. example 13);

FIG. 5: Schematic diagram of the preferred cross-sectional shapes of the novel solid electrolyte for use in the novel process;

FIG. 6: Schematic diagram of an integrated process for the preparation of chlorine and potassium, in which a chloralkali electrolysis and the novel electrolysis process are coupled.

The novel process is operated in an electrolysis cell having a liquid potassium amalgam anode, preferably an electrolysis cell having a moving liquid potassium amalgam anode. This is a moving liquid anode which becomes depleted with regard to its potassium content during operation, so that it can be replaced by amalgam which is richer in potassium and which can be obtained in a conventional amalgam cell of a chlorine/potassium production or by electrolysis of potassium salts, e.g. KOH, using an Hg or amalgam cathode.

This can be effected in a technically simple manner since the liquid potassium amalgam can be transported without problems. As a rule, the concentrated amalgam discharge of a conventional amalgam cell is heated in a heat exchanger to the operating temperature of the novel process and is fed to the hot, moving liquid anode. Expediently, this is effected in a countercurrent heat exchanger so that the depleted amalgam flowing out at high temperature heats the feed.

The replacement of depleted amalgam can be effected either batchwise or continuously. In the batchwise procedure, higher potassium concentrations, averaged over the batch turnover, are achieved. However, the continuous procedure is simpler to operate. In view of optimising space-time yield, it may have the disadvantage that the inflowing concentrated potassium amalgam is diluted with circulated amalgam which is already depleted of potassium, but that can easily be compensated by carrying out the process in a plurality of stages, for example two or three stages.

The liquid anode material (potassium amalgam) is expediently circulated either by stirring, or by means of a pump or by both stirring and a pump, under atmospheric or slightly superatmospheric pressure. The circulation caused by the turnover-related exchange of amalgam or the thermal convection is negligible in comparison with the circulation produced in the novel process and is not sufficient to achieve the preferred current densities.

If the liquid anode as described in GB 1,155,927 is operated without circulation, only current densities of from 40 to 70 A/m$^2$ are achievable. With an increase in the cell voltage, the current density can be increased only to an insubstantial extent because the resistance of the cell increases with increasing current density. Surprisingly, at moderate cell voltages, i.e. cell voltages of from 0.9 to 1.6 volt for sodium amalgam and from 0.95 to 2.1 volt for potassium amalgam, current densities of from 250 to 3000 A/m$^2$ are achieved if the anode is moved. This is effected by stirring, for example by bubbling in gas or by means of a mechanical stirrer, or using a pump. A circulation in the form of forced flow is preferred, as can be achieved, for example, by means of an amalgam circulation operated by a pump.

The current supply on the anode side is expediently effected via the stainless steel housing of the electrolysis cell. (A stainless steel housing is stable under the reaction conditions.) The anode side is electrically insulated from the cathode side in a suitable manner.

The cathode consists of potassium metal which is present in liquid form at the temperatures which are required for stabilizing the anode process. On assembly of the electrolysis cell, the potassium is advantageously introduced in the form of a solid reservoir into the cathode space. At the beginning of the electrolysis, the potassium is then melted. However, the potassium can also be introduced in liquid form at the beginning of the electrolysis into the cathode space. The potassium metal formed in the novel process can be removed in a technically simple manner through an overflow from the cathode space, it being ensured, by throttling the potassium stream, that the pressure on the potassium side is higher than the pressure on the amalgam side. Potential mercury contamination of the potassium metal obtained via micropores or other leaks is thus suppressed. The excess pressure of the cathode relative to the anode is from 0.1 to 5, preferably from 0.5 to 1, bar in the novel process.

The cathodic current supply is expediently via the potassium filling and the outflow tube or connecting flange.

The anode space and the cathode space are separated from one another by the novel potassium ion-conducting solid electrolyte comprising potassium β"-Al$_2$O$_3$ in the form of a suitable helium-tight ceramic moulding. Expediently, the solid electrolyte has the shape of a thin-walled and nevertheless pressure-resistant tube closed at one end (EP-B 0 424 673) at the open end of which an electrically insulating ring is attached by means of a helium-tight, likewise electrically insulating glass joint (GB 2 207 545, EP-B 0 482 785). The wall thickness of the potassium ion-conducting electrolyte is from 0.3 to 5 mm, preferably from 1 to 3 mm, particularly preferably from 1 to 2 mm. The cross-sectional shape of the tube closed at one end is circular in the preferred embodiment; in a further embodiment, it is possible to use cross-sectional shapes which have a larger surface and can be derived, for example, from the combination of a plurality of circular areas, as shown in FIG. 5. The design of the potassium ion-conducting solid electrolyte with regard to its leak-proof properties has a decisive influence on the novel process since mercury can enter the potassium produced only via leakage points in the solid electrolyte or sealing system, since, in the novel process, the anode potentials are set so that formation of mercury ions is ruled out. Typically, helium-tight solid electrolytes are used.

Furthermore, the detachable seals are preferably designed in such a way that potassium and amalgam are in each case sealed from the surrounding atmosphere. The presence of detachable seals between potassium and amalgam is as far as possible avoided because the detachable seals are as a rule liquid-tight but not gas-tight. In the case excluded, mercury vapour might diffuse through the detachable seal and contaminate the potassium in an undesired manner. In a preferred embodiment, detachable seals used are flat seals, preferably comprising graphite, for example comprising graphitic seals such as the GRAFIFLEX® seals produced by Freudenberg Simrit K G, Weinheim, Germany, or the SIGRAFLEX® seals produced by SGL Carbon AG, Wiesbaden/Meitingen, Germany. In a preferred embodiment, the seals are flushed with an inert gas, e.g. argon or nitrogen, in order to prevent oxygen from diffusing through. With helium-tight electrolytes and the sealing arrangement mentioned, residual mercury contents of from 0.05 to 0.3 ppm in the potassium are obtained.

When the potassium ion-conducting solid electrolytes are used for the first time, a ceramic resistance which is too high and which remains unchanged at a high level in the course of further operation is occasionally observed. The resistance of the solid electrolyte may exceed the achievable values by a factor of 30. This is generally due to lack of reactivity of the surface. The cause is typically the action of water. This may take place in particular during prolonged storage of the ceramics or during assembly if moisture is not adequately excluded. The ceramic tubes are therefore expediently packed in diffusion-tight aluminium/plastic laminated foils after sintering under reduced pressure. For storage, the ceramic tubes in the original packaging are enclosed in tightly sealing metal containers filled with argon. During the assembly, too, the ceramic should be protected from moisture as far as possible. For example, dry containers and electrolysis cells should be ensured and also unnecessarily long contact with humid air should be avoided.

Furthermore, a reduction in the ceramic resistance may take place as a result of conditioning of the ceramic:

The ceramic resistance may, for example, decrease substantially thereby if the cell is initially operated with pole reversal, i.e. the anode is first operated as the cathode. In this case, the cathode can consist of potassium amalgam and mercury, as would otherwise the anode. The current density in the state with pole reversal is increased over a time of from 1 to 44 h, preferably from 2 to 6 h, linearly from 30 to 1000 A/m$^2$.

The lowest ceramic resistances are obtained if, on starting up, for from 1 to 24 hours at an operating temperature of from 250 to 350° C., liquid potassium is first used as the anode and is then replaced by amalgam. This embodiment of the conditioning is particularly preferred.

During operation of the novel process, it is also essential to rule out the action of water vapour on the potassium ion-conducting ceramics. As a rule, for this purpose, the amalgam carrying traces of water is heated, the water vapour is removed and only then is the anhydrous amalgam of the liquid anode fed in. The removal of the water vapour is expediently promoted by stripping with inert gas or applying reduced pressure.

The operating temperature of the electrolysis cell is maintained within the range 260 to 400° C., preferably from 265 to 320° C., for example at 300° C. Under atmospheric pressure, the amalgam-mercury system at 400° C. is above the boiling point of mercury (357° C.). The undesired emission of mercury vapour can be counteracted by using a suitable reflux condenser and operation under superatmospheric pressure.

The current density is in general from 0.3 to 3, preferably from 0.5 to 1.5, kA/m$^2$. The current density is set in a controlled manner on the external current source, as a rule a mains rectifier.

In a particular embodiment, the novel electrolysis cell is integrated into the current supply of the amalgam-supplying chlorine cell, so that an additional mains rectifier can be dispensed with (FIG. 6).

In a preferred embodiment, the potassium ion-conducting ceramic is in the form of a tube which is closed at one end and is introduced concentrically into the interior of a larger outer tube. The outer tube consists of a material which is very tight and resistant to hot amalgam. Particularly suitable materials are stainless steel and graphite. The liquid anode flows through the annular gap between outer tube and ceramic tube in the longitudinal direction. The width of the annular gap is expediently from 1 to 10 mm, preferably from 2 to 5 mm, particularly preferably from 2.5 to 3 mm. The flow rate is from 0.03 to 1.0, preferably from 0.05 to 0.6, particularly preferably from 0.1 to 0.3, m/s. A higher flow rate generally permits higher current densities. A further design-related advantage of the anode in the form of an annular gap is the relatively small anode volume relative to the anode area. This makes it possible to meet the requirements of moderate apparatus weights and an acceptable mercury turnaround.

The cell voltage is composed substantially of the two following individual contributions: the electrochemical potential of the potassium-to-potassium amalgam redox system and the ohmic voltage drop over the electrical resistance of the ceramic electrolyte. Consequently, the cell voltage is a function of the current density. The electrochemical potential can be measured in the currentless state. It depends on the potassium concentration in the liquid anode. At a potassium concentration of 0.4% by weight, a cell voltage of about 1 V is generally established in the currentless state. At a current density of 1000 A/m$^2$, a cell voltage of from 1.4 to 1.5 V is generally established.

The cell voltage is monitored and is limited in order to avoid anode potentials at which relatively noble metallic impurities could be oxidized in the moving anode.

The value of the cell voltage may be an indicator for the mass transfer in the liquid moving anode to the ceramic surface and is as a rule monitored in this context. The mass transfer limitation may be caused by an excessively low potassium concentration in the anode and/or insufficient flow and/or a current density which is too high.

The operation in the range of mass transfer limitation, i.e. with excessive cell voltage, is tolerable only for a short time since, after operation for several days in this limiting flow range, irreversible damage to the ceramic, for example loss of conductivity and mechanical embrittlement with cracking, occurs.

In a preferred embodiment, the current direction is reversed at time intervals of from 1 to 24 hours for in each case from 1 to 10 minutes by short-circuiting anode and cathode via an external resistance. The resistance is dimensioned so that, on pole reversal, the current corresponds to about 1.5 times the current during operation. The yield of potassium obtained in the novel process is complete, based on the potassium converted on the anode side. The current efficiency with respect to potassium obtained is 100%, within the accuracy of measurement, in a mode of operation with normal polarities. The pole reversal at intervals reduces the averaged current efficiency to values of from 95 to 98%.

In a preferred embodiment, the amalgam fed to the anode is reduced from 0.4% by weight to 0.1% by weight of potassium. When coupled with a chloralkali electrolysis, the unconverted potassium is not lost because it is recycled into the chloralkali cell and returns from there via the amalgam circulation. Thus, the present invention also relates to a process as described above, for the preparation of chlorine and potassium metal starting from potassium chloride, which comprises the following steps:
(i) carrying out a chloralkali electrolysis to give elemental chlorine and potassium amalgam;
(ii) carrying out a process as defined above to give potassium metal.

EXAMPLES

Example 1

Preparation of Potassium Aluminate Powders

By dry blending of corresponding amounts of the starting materials mentioned below with coarse $\alpha$-$Al_2O_3$ powder and subsequent calcining at 1200° C. for 1 hour, the following powders were prepared:

| Powder | Composition Remainder in each case $Al_2O_3$ | Starting materials (except for $\alpha$-$Al_2O_3$) |
|---|---|---|
| A | 12% by wt. of $K_2O$ | $KHCO_3$ |
| B | 12% by wt. of $K_2O$, 0.7% by wt. of $Li_2O$ | $KHCO_3$, $LiOH \cdot H_2O$ |
| C | 11.6% by wt. of $K_2O$, 4% by wt. of $MgO$ | $KHCO_3$, $MgO$ |
| D | 14% by wt. of $K_2O$ | $KHCO_3$ |
| E | 15% by wt. of $K_2O$ | $KHCO_3$ |
| F | 20% by wt. of $K_2O$ | $KHCO_3$ |
| G | 30% by wt. of $K_2O$ | $KHCO_3$ |
| H | 40% by wt. of $K_2O$ | $KHCO_3$ |

Example 2

Production of a Potassium $\beta''$-$Al_2O_3$ Ceramic

A lithium-stabilized (0.3% by weight of lithium, calculated as the element) sodium $\beta''$-$Al_2O_3$ ceramic (tube closed at one end and having a length of 100 mm, an external diameter of 33 mm and a wall thickness of 1.5 mm) having the composition $Na_2O$:$Al_2O_3$=1:6.8 was weighed and was embedded in more than four times the amount by weight of powder A in a magnesium oxide saggar with a cover. Saggar and content were heated at a heating rate of 300° C./h to 1200° C. and then at a heating rate of 100° C./h to 1400° C., kept at this temperature for three hours and then allowed to cool to room temperature. This procedure was then repeated three times but in each case with new powder B instead of powder A. The powder was discarded in each case after use. The ceramic tube was then washed in deionized water with ultrasonic agitation, dried and weighed. The weight increase of 4.44% by weight indicates that more than 99% of the sodium in the ceramic had been replaced by potassium, which was confirmed by X-ray diffraction (analysis of crystal structure and unit cell dimensions) and X-ray fluorescence measurements (Na and K content). No cracks occurred, as shown by dye penetrant inspection under ultraviolet lamp. The resistivity of the ceramic thus produced was 23.0 $\Omega$cm at 300° C.

Example 3

Production of a Potassium $\beta''$-$Al_2O_3$ Ceramic

Example 2 was repeated with a lithium-stabilized sodium $\beta''$-$Al_2O_3$ ceramic identical except for additional stabilization with 8% by weight of $ZrO_2$. The weight increase of 4.10% by weight indicates that more than 99% of the sodium in the ceramic had been replaced by potassium. No cracks occurred.

Example 4

Production of a Potassium $\beta''$-$Al_2O_3$ Ceramic

A magnesium-stabilized (2.4% by weight of magnesium, calculated as the element), sodium $\beta''$-$Al_2O_3$ ceramic was treated as in example 2, but powder C was used instead of powder B. The weight increase of 4.48% by weight indicates that more than 98% of the sodium in the ceramic had been replaced by potassium. Cracks did not occur.

Example 5 (Comparative Example)

Production of a Potassium $\beta''$-$Al_2O_3$ Ceramic

A lithium-stabilized (0.3% by weight of lithium, calculated as the element) sodium $\beta''$-$Al_2O_3$ ceramic (tube closed at one end and having a length of 100 mm, an external diameter of 33 mm and a wall thickness of 1.5 mm) having the composition $Na_2O$:$Al_2O_3$=1:6.8 was weighed and was embedded in more than four times the amount of powder D in a magnesium oxide saggar with a cover. Saggar and content were heated at a heating rate of 300° C./h to 1350° C., kept at this temperature for two hours and then allowed to cool to room temperature. The ceramic tube was then washed in water by means of ultrasonics, dried and weighed. Weighing and X-ray fluorescence measurements showed that 76% of the sodium had been replaced by potassium.

Example 6 (Comparative Example)

Production of a Potassium $\beta''$-$Al_2O_3$ Ceramic

The tube produced in example 5 was kept in the powder D already used for example 5, once again for 4 hours at 1350° C. Although further weighing indicated 98% exchange of Na for K, X-ray diffraction measurements showed that a considerable proportion of $KAlO_2$ was present. This proportion was removed by washing in water, and further weighing then showed that only 80% of the sodium in the $\beta''-Al_2O_3$ had been exchanged for potassium.

Example 7 (Comparative Example)

Production of a Potassium $\beta''-Al_2O_3$ Ceramic

The tube produced in example 6 was kept in new powder D, once again for 4 hours at 1350° C. The weighing once again indicated 98% exchange of Na for K, but X-ray diffraction measurements showed once again that a considerable proportion of $KAlO_2$ had formed. This proportion was removed by washing in water, and further weighing then showed that still only 80% of the sodium in the $\beta''-Al_2O_3$ had been exchanged for potassium.

Examples 8-11 (Comparative Examples)

Production of Potassium $\beta''-Al_2O_3$ Ceramics

Four samples of a lithium-stabilized (0.3% by weight of lithium, calculated as the element) sodium $\beta''-Al_2O_3$ ceramic having the composition $Na_2O:Al_2O_3=1:6.8$ were weighed and were embedded in each case in more than four times the amount by weight of powders E, F, G and H, respectively, in magnesium oxide saggars with covers. Saggar and content were in each case heated at a rate of 300° C./h to 1350° C., kept at this temperature for four hours and then allowed to cool to room temperature. The samples were then weighed, washed in water by means of ultrasonics, dried and weighed again. The weight differences showed that an increase in the potassium content of the powder used merely leads to an increase in the $KAlO_2$ fraction and not to an increasing degree of exchange of Na for K.

Example 12

Production of a Potassium $\beta''-Al_2O_3$ Ceramic

A sample of a lithium-stabilized (0.3% by weight of lithium, calculated as the element) sodium $\beta''-Al_2O_3$ ceramic having the composition $Na_2O:Al_2O_3=1:6.8$ was weighed and was embedded in more than four times the amount by weight of powder A in a magnesium oxide saggar with a cover. Saggar and content were heated at a heating rate of 300° C./h to 1400° C., kept at this temperature for three hours and then allowed to cool to room temperature. This procedure was repeated once with new powder A. The ceramic tube was then washed in deionized water with ultrasonic agitation, dried and weighed. Weighing and X-ray fluorescence measurements showed that 92% of the sodium had been replaced by potassium.

Example 13 (Comparative Example)

Production of a Potassium $\beta''-Al_2O_3$ Ceramic

Example 12 was repeated, the sample prepared being cooled and then being kept for 18 hours at 360° C. in a potassium nitrate melt. After cooling, the sample was washed in order to remove residues of the melt, said sample breaking in spite of careful handling. The weighing indicated a degree of exchange of 98%.

Example 13 shows that it is not reasonably possible to ion exchange partially by vapour phase and the complete the exchange by the molten salt method.

Example 14

Preparation of Potassium Metal

An apparatus as shown schematically in FIG. 2 was used. A ring comprising α-aluminium oxide (2) was mounted helium-tight by means of a glass joint at the open end of a tube (1) produced according to example 1, closed at one end and comprising potassium $\beta''-Al_2O_3$. By means of this ring, the tube was installed and sealed with the orifice facing upward in an electrolysis cell in the form of a cylindrical stainless steel container (3) (having an internal diameter of about 80 mm and a length of about 150 mm and comprising austenitic stainless steel 1.4571). For this purpose, the ring comprising alpha-aluminium oxide (2), with one flat seal each at the bottom (4) and top (5), was pressed over the housing flange (6) and the cover flange (7) by means of three clamping bolts (8). Handling and installation of the ion conductor were effected under argon.

An anode current feed (9) was mounted on the stainless steel container. A pipe connection (10) was welded on laterally at the top for the supply of amalgam, and a pipe connection (11) was welded on laterally at the bottom for the outflow. A stainless steel pipe (13) projected from the cover flange, as a cathodic current feed, into the orifice of the tube (1). The same pipe (13) is passed through the cover flange and is drilled laterally at the top for removing liquid potassium. The apparatus was wound with electrical heating ribbons (14) and thermally insulated (15).

A stirrer (18) (length 42 mm, diameter 5 mm) was installed at the bottom of the vessel. The stirrer was driven by a magnetic stirrer customary in the laboratory. The stirrer was held on the bottom of the electrolysis cell by means of a pin and a ball bearing, in order to prevent it from floating in the amalgam with its high density of 13 600 kg/m³. The stirrer speed was not more than 100 rpm.

The anode was the amalgam filling (16) between housing and the outer wall of the potassium ion-conducting solid electrolyte tube (1). The cathode (17) was the liquid potassium metal filling inside the potassium ion-conducting solid electrolyte tube (1). The liquid potassium metal formed was discharged at a pressure generated by the reaction via the heated outflow pipe into a vessel (20) provided with an inert atmosphere by means of argon (21) and partly filled with liquid paraffin (22), and solidified in the liquid paraffin (22) in the form of small spheres (23). Owing to the density of potassium metal of 0.86 g/cm³, the potassium spheres floated briefly below the surface of the liquid paraffin.

Experimental Procedure:

The installed ceramic tube was filled with potassium metal. Thereafter, both chambers of the cell were flooded with argon and the cell was closed. The anode space was filled with 8 kg of 0.4% strength by weight potassium amalgam, which was stirred. The filled cell was then heated at a heating rate of 20° C./h to 250° C. In the currentless state, a cell voltage of 1.007 V was established. A current of 1 A was then applied, and a voltage of 1.9 V was initially established. The current was increased to 10 A over 3 hours. At the individually applied currents, the following cell voltage was established:

| Current [A]: | 0 | 2 | 4 | 6 | 8 | 10 |
|---|---|---|---|---|---|---|
| Cell voltage [V]: | 1.007 | 1.091 | 1.175 | 1.259 | 1.343 | 1.427 |

After about 60 minutes at 10 A, the voltage had increased to 1.480 V, since the potassium content in the amalgam had decreased according to Faraday's law. The amount of potassium formed likewise corresponded to Faraday's law. The Hg content of the potassium metal, <0.1 ppm, was below the limit of detection, and the sodium content was 0.02%.

Example 14 shows that low cell voltages are achieved in an excellent manner using the novel ion conductor.

Example 15

Preparation of Potassium Metal

After example 14 had been carried out, example 14 was repeated a total of 15 times in the apparatus described there. In each individual procedure, a cell voltage of 1.007 V was established in the currentless state, and cell voltages of from 1.427 V to 1.480 V were achieved at 10 A. The current density was in each case about 1000 A/m².

Example 15 shows that the novel ion conductor is very stable.

Example 16

Preparation of Potassium Metal

An apparatus as shown schematically in FIG. 3 was used. A ring comprising α-aluminium oxide (32) was mounted helium-tight by means of a glass joint at the open end of a tube (31) produced according to example 1, closed at one end and comprising potassium β"-Al₂O₃. By means of this ring, the tube was installed and sealed with the orifice facing downward in an electrolysis cell in the form of a cylindrical stainless steel container (33) (having an internal diameter of about 37 mm and a length of about 105 mm and comprising austenitic stainless steel 1.4571), so that an annular gap having a width of 2.5 mm formed between the ion conductor and the inner wall of the electrolysis cell. For this purpose, the ring comprising α-aluminium oxide (32), with one flat seal each at the bottom (35) and top (34), was pressed over the housing flange (36) and the cover flange (37) by means of three clamping bolts (38). Handling and installation of the ion conductor were effected under argon.

An anode current feed (39) was attached to the stainless steel container. A pipe connection (40) was welded on laterally at the bottom for the supply of amalgam, and a pipe connection (41) was welded on laterally at the top for the outflow. A stainless steel pipe (43) projected from the cover flange, as the cathodic current feed, into the orifice of the tube comprising potassium β"-Al₂O₃. The same pipe (43) was passed through the cover flange and served for free removal of liquid potassium metal. The cell was wound with electrical heating ribbons (44) and was thermally insulated.

The anode was formed by amalgam filling in the annular space between steel pipe inner wall and outer wall of the potassium ion-conducting solid electrolyte tube. The cathode was the liquid potassium metal filling inside the potassium ion-conducting solid electrolyte tube. The liquid potassium metal formed was discharged at the pressure generated by the reaction via the heated outflow pipe 43 into a vessel which had been rendered inert and was partly filled with liquid paraffin, and solidified in liquid paraffin in the form of small spheres.

The electrolysis cell was designed for continuous operation, and the following functions were integrated (FIG. 4):
Continuous supply (51) with dry preheated K-rich amalgam.
Heating (52) designed for heating in the range from 265° C. to 400° C.
Direct current supply (53)
Defined flow rate in the anode through an internal amalgam circulation (54) operated by means of a pump (55), continuously adjustable from 0.02 to 0.8 m/sec.
Discharge of liquid potassium metal (56).
Continuous disposal of low-potassium amalgam (57).
Waste gas treatment (58).
Safety monitoring particularly with regard to Hg emission (59).

Experimental Procedure:

The apparatus was heated at 20° C./h to 270° C. The cathode space inside the ceramic tube closed at one end was then filled via a feed line with externally melted potassium metal, and the anode space outside the ceramic tube was likewise filled with liquid potassium metal. The current was increased once from 4 A to 20 A in steps of 4 A in each case over a period of 40 minutes and then kept at 20 A for 4 hours. The cell voltage followed the current steps in the following manner:

| Current [A]: | 0 | 4 | 8 | 12 | 16 | 20 |
|---|---|---|---|---|---|---|
| Cell voltage [V]: | 0 | 0.168 | 0.336 | 0.504 | 0.672 | 0.840 |

The amalgam circulation was then filled with 0.4% strength by weight potassium amalgam. The content of the amalgam circulation was heated to 270° C. with the pump switched off, and the circulation was then put into operation. The potassium metal present in the anode space was flushed out and was distributed in solution in the amalgam.

This first filling was discarded, and the circulation was filled with fresh amalgam heated to 270° C. and having a potassium content of 0.4% by weight. A mean flow rate of 0.4 m/s, corresponding to a circulation volume flow of 0.39 m³/h, was established. The output voltage of a direct current power supply was limited to 2.2 volt and the circuit was connected to the cell. The current was increased linearly from 0 to 10 A in the course of 3 hours. The cell voltage followed the current steps in the following manner:

| Current [A]: | 0 | 2 | 4 | 6 | 8 | 10 |
|---|---|---|---|---|---|---|
| Cell voltage [V]: | 1.007 | 1.091 | 1.175 | 1.295 | 1.343 | 1.427 |

8.5 kg of amalgam were then discharged in each case from the circulation content at time intervals of 60 minutes and replaced by fresh amalgam. It was observed that the cell voltage at 10 A varied from 1.45 volt after filling to 1.47 volt before discharge. A current of 10 A in combination with an anode area of 100 cm² gives a current density of 1000 A/m².

Potassium metal was discharged continuously. The potassium discharge and the depletion of the amalgam corresponded to Faraday's law. The results of the analysis of examples 14 and 15 were confirmed.

Example 16 shows that the novel ion conductor is very stable during continuous operation for potassium production.

Example 17 (Comparative Example)

Preparation of Potassium Metal

Example 14 was repeated using the tube produced in comparative example 5, closed at one end and comprising potassium β"-Al$_2$O$_3$. On installation, however, only 17 g of potassium metal were introduced into the ceramic tube, which was therefore not completely filled and filled only during the reaction.

In the currentless state, a cell voltage of 1.007 V was likewise established. After a current of 1 A had been applied, a voltage of 1.9 V was initially established. After 15 minutes, the resulting voltage was 1.5 V. After 5 hours, the voltage collapsed and a short-circuit occurred between anode and cathode. On dismantling, it was found that the ceramic was cracked in many places.

Example 14 shows the considerable influence of the ceramic used on the electrolysis.

What is claimed is:

1. A process for the preparation of potassium metal starting from potassium amalgam by electrolysis using a potassium amalgam-containing anode, a potassium ion-conducting solid electrolyte and liquid potassium metal as the cathode, wherein a solid polycrystalline potassium ion conductor having a β"-Al$_2$O$_3$ structure obtainable by means of ion exchange of the alkali metal ions of a polycrystalline alkali metal β"-Al$_2$O$_3$ moulding, in which the alkali metal ions are sodium ions or a mixture of sodium and potassium ions and the molar ratio M$_2$O (M=alkali metal) to Al$_2$O$_3$ is 1:x, x being an integer or non-integer number within the range 5 to 11, for potassium ions, the ion exchange being effected by a process wherein neither chloride-containing nor liquid potassium ion sources are used, the process comprising the steps of:
    embedding the polycrystalline alkali metal β"-Al$_2$O$_3$ moulding in an oxidic powder containing potassium and aluminium of a molar K$_2$O to Al$_2$O$_3$ ratio within the range 1:(x−1) to 1:(x+1), the weight of oxidic powder amounting to at least two times the weight of the moulding;
    heating the embedded moulding at a rate of at least 100° C. per hour to at least 1100° C.; and
    further heating to at least 1300° C., this temperature being maintained for at least one hour prior to cooling, is used as the solid electrolyte.

2. A process according to claim 1, wherein a temperature of from 260 to 400° C. and a current density of at least 250 A/m$^2$ are used.

3. An integrated process for the preparation of chlorine and potassium metal starting from potassium chloride, which comprises the following steps:
    (i) carrying out a chloralkali electrolysis by an amalgam method to give elemental chlorine and potassium amalgam;
    (ii) carrying out a process according to claim 1 to give potassium metal.

4. The process for the preparation of potassium metal starting from potassium amalgam by electrolysis using a potassium amalgam-containing anode, a potassium ion-conducting solid electrolyte and liquid potassium metal as the cathode according to claim 1, wherein the sodium β"-Al$_2$O$_3$ moulding used as starting material has a molar Na$_2$O to Al$_2$O$_3$ ratio within the range 1:6 to 1:7.

5. The process for the preparation of potassium metal starting from potassium amalgam by electrolysis using a potassium amalgam-containing anode, a potassium ion-conducting solid electrolyte and liquid potassium metal as the cathode according to claim 1, wherein the potassium ion conductor additionally contains lithium, magnesium and/or zirconium.

6. The process for the preparation of potassium metal starting from potassium amalgam by electrolysis using a potassium amalgam-containing anode, a potassium ion-conducting solid electrolyte and liquid potassium metal as the cathode according to claim 1, wherein the potassium ion conductor is free of chlorine and comprises at least 90% by weight of potassium β"-Al$_2$O$_3$.

7. An integrated process for the preparation of chlorine and potassium metal starting from potassium chloride, which comprises the following steps:
    (i) carrying out a chloralkali electrolysis by an amalgam method to give elemental chlorine and potassium amalgam;
    (ii) carrying out a process according to claim 2 to give potassium metal.

8. An integrated process for the preparation of chlorine and potassium metal starting from potassium chloride, which comprises the following steps:
    (i) carrying out a chloralkali electrolysis by an amalgam method to give elemental chlorine and potassium amalgam;
    (ii) carrying out a process according to claim 4 to give potassium metal.

9. An integrated process for the preparation of chlorine and potassium metal starting from potassium chloride, which comprises the following steps:
    (i) carrying out a chloralkali electrolysis by an amalgam method to give elemental chlorine and potassium amalgam;
    (ii) carrying out a process according to claim 5 to give potassium metal.

10. An integrated process for the preparation of chlorine and potassium metal starting from potassium chloride, which comprises the following steps:
    (i) carrying out a chloralkali electrolysis by an amalgam method to give elemental chlorine and potassium amalgam;
    (ii) carrying out a process according to claim 6 to give potassium metal.

* * * * *